(12) United States Patent
Hong et al.

(10) Patent No.: US 12,529,897 B2
(45) Date of Patent: Jan. 20, 2026

(54) WEARABLE ELECTRONIC DEVICE INCLUDING DISPLAY

(71) Applicant: Samsung Electronics Co., Ltd., Suwon-si (KR)

(72) Inventors: Sungbin Hong, Suwon-si (KR); Yonghee Jeung, Suwon-si (KR); Dongok Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 515 days.

(21) Appl. No.: 17/967,234

(22) Filed: Oct. 17, 2022

(65) Prior Publication Data

US 2023/0034288 A1 Feb. 2, 2023

Related U.S. Application Data

(63) Continuation of application No. PCT/KR2020/017651, filed on Dec. 4, 2020.

(30) Foreign Application Priority Data

Jun. 1, 2020 (KR) .................. 10-2020-0065661

(51) Int. Cl.
*G02B 27/01* (2006.01)
*F21V 8/00* (2006.01)

(52) U.S. Cl.
CPC ......... *G02B 27/0172* (2013.01); *G02B 6/003* (2013.01); *G02B 2027/0134* (2013.01); *G02B 2027/014* (2013.01); *G02B 2027/0178* (2013.01)

(58) Field of Classification Search
None
See application file for complete search history.

(56) References Cited

U.S. PATENT DOCUMENTS

| 10,514,544 B1 | 12/2019 | Yoon |
| 2015/0138248 A1 | 5/2015 | Schrader |

(Continued)

FOREIGN PATENT DOCUMENTS

| CN | 205485086 U | 8/2016 |
| CN | 206161958 U | 5/2017 |

(Continued)

OTHER PUBLICATIONS

European Search Report dated Oct. 24, 2023, issued in European Application No. 20939127.5.

(Continued)

*Primary Examiner* — Bao-Luan Q Le
*Assistant Examiner* — Danell L Owens
(74) *Attorney, Agent, or Firm* — Jefferson IP Law, LLP

(57) ABSTRACT

A wearable electronic device is provided. The wearable electronic device includes a display, a first transparent member including a first surface facing a user's right eye and a second surface facing away from the first surface, a second transparent member including a third surface disposed to face the user's left eye, and a fourth surface facing away from the third surface, and a processor configured to output a first image by using a first region of the display or output a second image by using a second region different from the first region, wherein the first transparent member receives the first image and provides the first image to the user's right eye, and the second transparent member receives the second image and provides the second image to the user's left eye.

16 Claims, 7 Drawing Sheets

(56) References Cited

U.S. PATENT DOCUMENTS

| | | |
|---|---|---|
| 2016/0021360 A1 | 1/2016 | Nishizawa et al. |
| 2016/0139411 A1 | 5/2016 | Kang et al. |
| 2016/0231570 A1 | 8/2016 | Levola et al. |
| 2016/0234485 A1* | 8/2016 | Robbins ............... H04N 13/332 |
| 2016/0327795 A1 | 11/2016 | Jarvenpaa et al. |
| 2017/0123209 A1 | 5/2017 | Spitzer et al. |
| 2017/0176747 A1 | 6/2017 | Vallius et al. |
| 2017/0184848 A1 | 6/2017 | Vallius |
| 2017/0186231 A1 | 6/2017 | Petrov |
| 2018/0046859 A1* | 2/2018 | Jarvenpaa ............... A61B 3/113 |
| 2018/0113309 A1 | 4/2018 | Robbins et al. |
| 2018/0203243 A1 | 7/2018 | Huang |
| 2018/0275415 A1 | 9/2018 | Schowengerdt et al. |
| 2018/0292654 A1 | 10/2018 | Wall et al. |
| 2019/0026871 A1 | 1/2019 | Han et al. |
| 2019/0041642 A1 | 2/2019 | Haddick et al. |
| 2019/0155032 A1 | 5/2019 | Vallius et al. |
| 2019/0285899 A1 | 9/2019 | Levola et al. |
| 2020/0192105 A1 | 6/2020 | Sakatsume et al. |
| 2021/0333561 A1 | 10/2021 | Oh et al. |
| 2021/0373333 A1 | 12/2021 | Moon |

FOREIGN PATENT DOCUMENTS

| | | | |
|---|---|---|---|
| CN | 107924059 A | 4/2018 | |
| CN | 108427193 A | 8/2018 | |
| CN | 108474952 A | 8/2018 | |
| CN | 209821509 U | 12/2019 | |
| JP | 2013-114022 A | 6/2013 | |
| JP | 5750978 B2 | 7/2015 | |
| JP | 2016-033551 A | 3/2016 | |
| KR | 10-1999-0086086 A | 12/1999 | |
| KR | 10-2018-0014567 A | 2/2018 | |
| KR | 10-2018-0037887 A | 4/2018 | |
| KR | 10-2019-0019685 A | 2/2019 | |
| KR | 10-2019-0097894 A | 8/2019 | |
| KR | 20190097894 A * | 8/2019 | ............ G02B 27/01 |
| KR | 10-2019-0106913 A | 9/2019 | |
| TW | 1619996 B | 4/2018 | |
| WO | 2018/175776 A1 | 9/2018 | |
| WO | 2019/189868 A1 | 10/2019 | |

OTHER PUBLICATIONS

Korean Office Action dated Feb. 12, 2025, issued in Korean Application No. 10-2020-0065661.

Chinese Office Action dated Apr. 17, 2025, issued in Chinese Application No. 202080101584.5.

Chinese Office Action dated Sep. 4, 2025, issued in Chinese Application No. 202080101584.5.

* cited by examiner

WEARABLE ELECTRONIC DEVICE INCLUDING DISPLAY

CROSS-REFERENCE TO RELATED APPLICATION(S)

This application is a continuation application, claiming priority under § 365(c), of an International application No. PCT/KR2020/017651, filed on Dec. 4, 2020, which is based on and claims the benefit of a Korean patent application number 10-2020-0065661, filed on Jun. 1, 2020, in the Korean Intellectual Property Office, the disclosure of which is incorporated by reference herein in its entirety.

BACKGROUND

1. Field

The disclosure relates to an electronic device. More particularly, the disclosure relates to a wearable electronic device including a display.

2. Description of Related Art

With the development of electronic, information, and communication technologies, various functions have come to be integrated into a single electronic device. For example, an electronic device (e.g., a smartphone) includes functions of an audio player, an imaging device, or a digital diary, in addition to a communication function, and various additional functions may be implemented in the smartphone through additional installation of applications. An electronic device may be provided with various pieces of information in real time by accessing a server or another electronic device in a wired or wireless manner as well as by executing an installed application or a stored file.

As the use of electronic devices becomes commonplace, user demands for portability and usability of electronic devices may increase. In response to such user demands, electronic devices capable of being carried and used in the state of being worn on a user's body, like a wrist watch or glasses, have been commercialized. Among wearable electronic devices, an electronic device that is wearable on a user's face may be usefully used to implement virtual reality or augmented reality. For example, a wearable electronic device may generally implement virtual reality by blocking an image of a real space in which a user is staying while providing a three-dimensional image of a virtual space in a game that has been enjoyed through a television or a computer monitor. A wearable electronic device may implement augmented reality that provides various pieces of visual information to a user by implementing a virtual image while providing an environment in which a user is able to visually recognize an actual image of a space in which the user is staying. A user may visually experience a wearing state of clothing, which is not actually worn, or an arrangement state of furniture or home appliances, which are not actually arranged, through augmented reality implemented by a wearable electronic device. For example, in shopping, even if a user does not actually wear or use a product, the user may experience the wearing state or the use state (or the arrangement state) in advance through the augmented reality provided by the electronic device. In another embodiment, augmented reality may provide information about objects or buildings around a user. For example, a wearable electronic device may provide information about the arrangement of stores in a building viewed by a user or information about products and prices handled in each of the stores through augmented reality. For example, a user may use a wearable electronic device that implements augmented reality while moving in a state of wearing the wearable electronic device on a daily basis.

The above information is presented as background information only to assist with an understanding of the disclosure. No determination has been made, and no assertion is made, as to whether any of the above might be applicable as prior art with regard to the disclosure.

SUMMARY

In order to provide a virtual image, a wearable electronic device implementing augmented reality may include electronic components such as displays, power sources (e.g., batteries) or control circuits that correspond to a user's left and right eyes, respectively. For example, displays, optical systems that guide an image from the display to the user's eyes, power supplies, or control circuits may be provided in a pair. However, since the optical systems or electronic components are arranged in a pair, the weight of the wearable electronic device may increase. As the weight of the wearable electronic device increases, deterioration in a wearing feeling or a feeling of pressure may be further increased when the electronic device is worn for a long time. For example, the wearable electronic device may press a user's body part that comes into contact with the electronic device, for example, the user's nose or ears.

Aspects of the disclosure are to address at least the above-mentioned problems and/or disadvantages and to provide at least the advantages described below. Accordingly, an aspect of the disclosure is to provide an electronic device that is wearable on a user's face and is reduced in weight.

Another aspect of the disclosure is to provide an electronic device capable of realizing augmented reality by providing a virtual image that is in harmony with an image of surroundings of a user in the state of being worn by the user.

Additional aspects will be set forth in part in the description which follows and, in part, will be apparent from the description, or may be learned by practice of the presented embodiments.

In accordance with an aspect of the disclosure, a wearable electronic device is provided. The wearable electronic device includes a display, a first transparent member configured to input light, which enters through a second surface, to the user's right eye and including a first surface disposed to face a user's right eye, and the second surface facing away from the first surface, a second transparent member configured to input light, which enters through a fourth surface, to the user's left eye and including a third surface disposed to face the user's left eye, and the fourth surface facing away from the third surface, and a processor configured to output a first image by using a first region of the display or output a second image by using a second region different from the first region, wherein the first transparent member may be configured to receive the first image and input the first image to the user's right eye, and wherein the second transparent member is configured to receive the second image and input the second image to the user's left eye.

In accordance with another aspect of the disclosure, a wearable electronic device is provided. The wearable electronic device includes a display, a first transparent member disposed to face a user's right eye, and configured to transmit light incident from the outside to enter the user's right eye, a second transparent member disposed to face the user's left eye and configured to transmit light incident from the outside and input the light to the user's left eye, at least one first projection lens disposed to correspond to a first region of the display and configured to guide or input an image (hereinafter, "first image") output from the first region to the first transparent member, and at least one second projection lens disposed to correspond to a second region of the display that is different from the first region, and configured to guide or input an image (hereinafter, "second image") output from the second region to the second transparent member, wherein the first transparent member may be configured to receive the first image and provide the first image to the user's right eye, and the second transparent member may be configured to receive the second image and provide the second image to the user's left eye.

According to various embodiments disclosed herein, the wearable electronic device provides capable of implementing augmented reality by separating images, which are output from different regions of the display, and providing the separated images to the user's left eye and right eye, respectively. For example, since it is possible to provide virtual images corresponding to the user's left and right eyes through a single display, it is possible to reduce the weight of the wearable electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
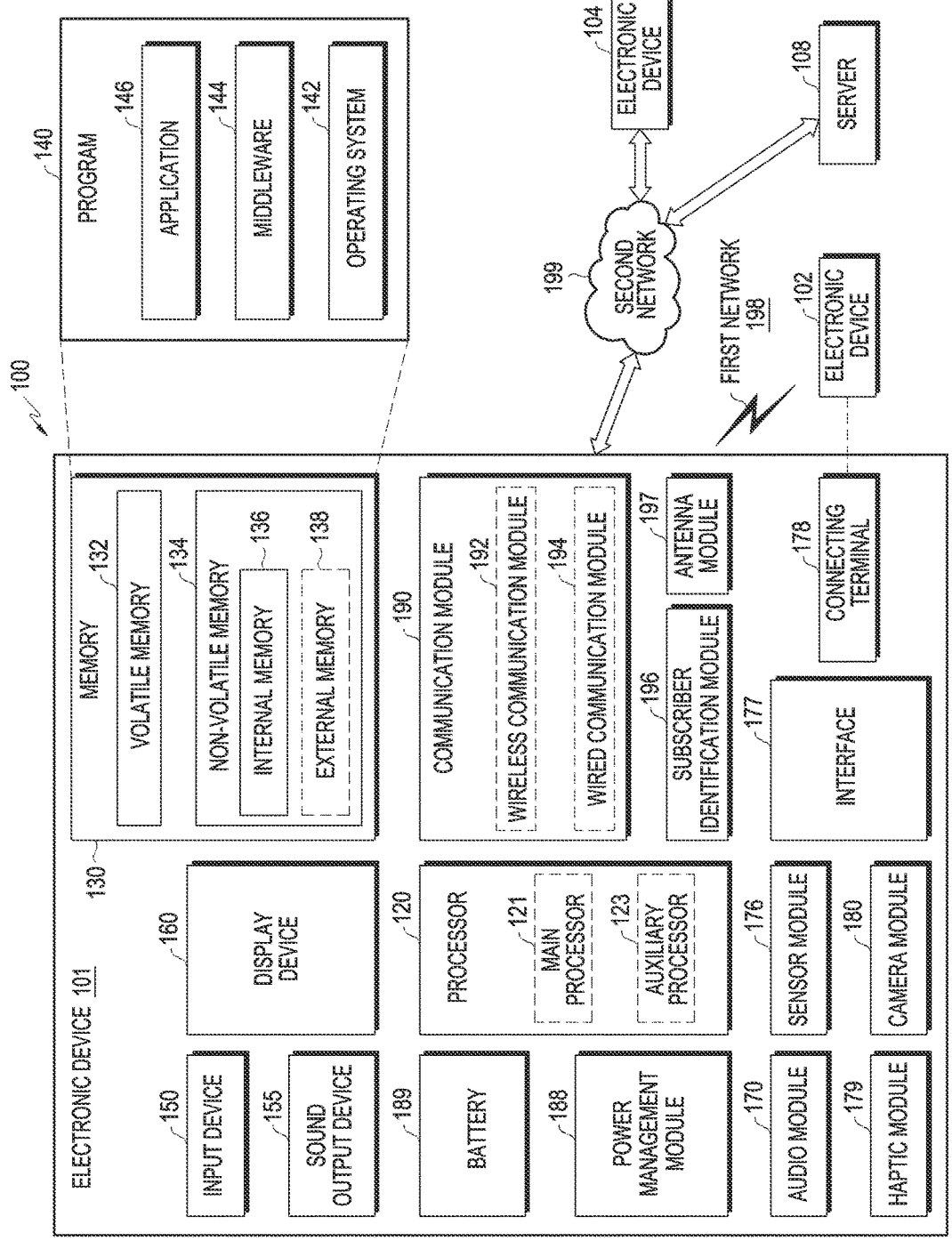
FIG. 1 is a block diagram of an electronic device 101 in a network environment 100 according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
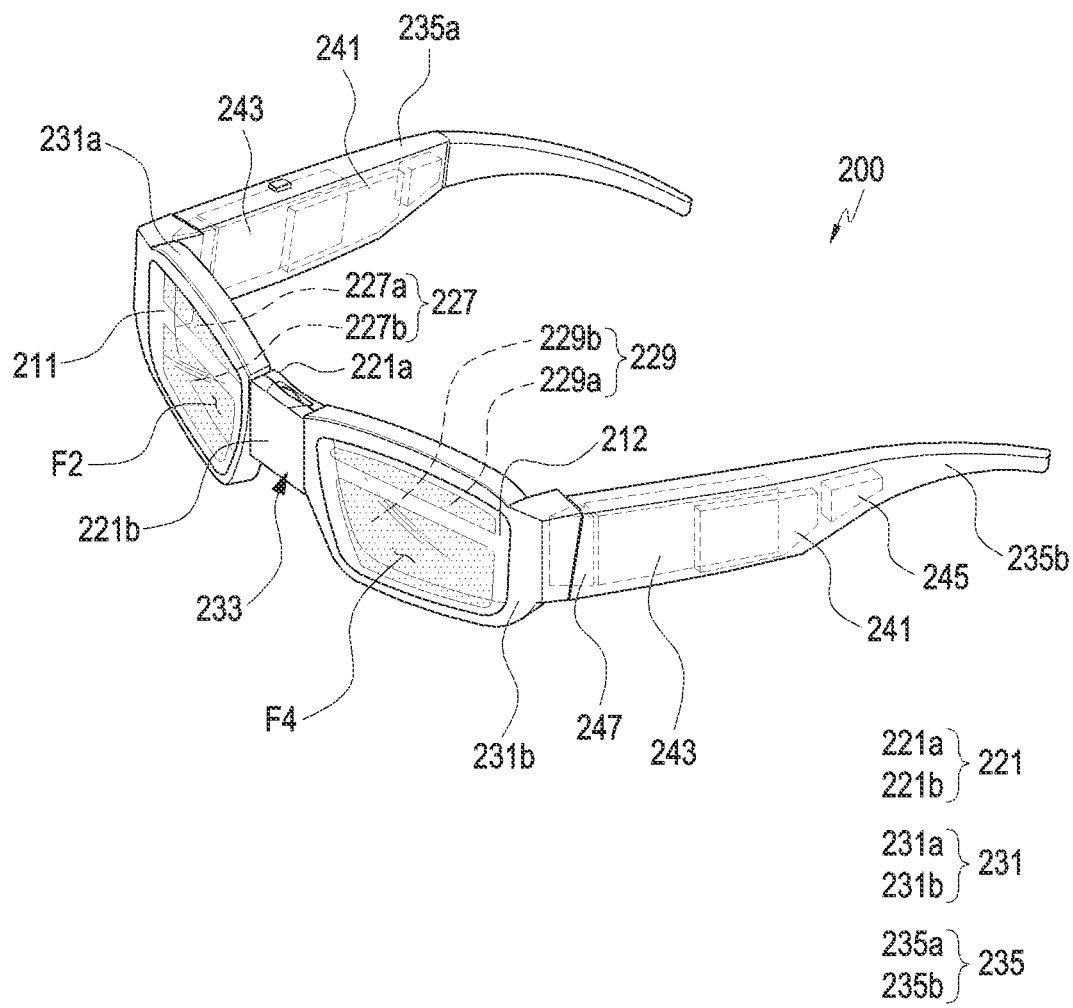
FIG. 2 is a perspective view illustrating a wearable electronic device according to an embodiment of the disclosure.

FIG. 2 is a perspective view illustrating a wearable electronic device (e.g., the electronic device 101 in FIG. 1) according to an embodiment of the disclosure.

Figure 3:
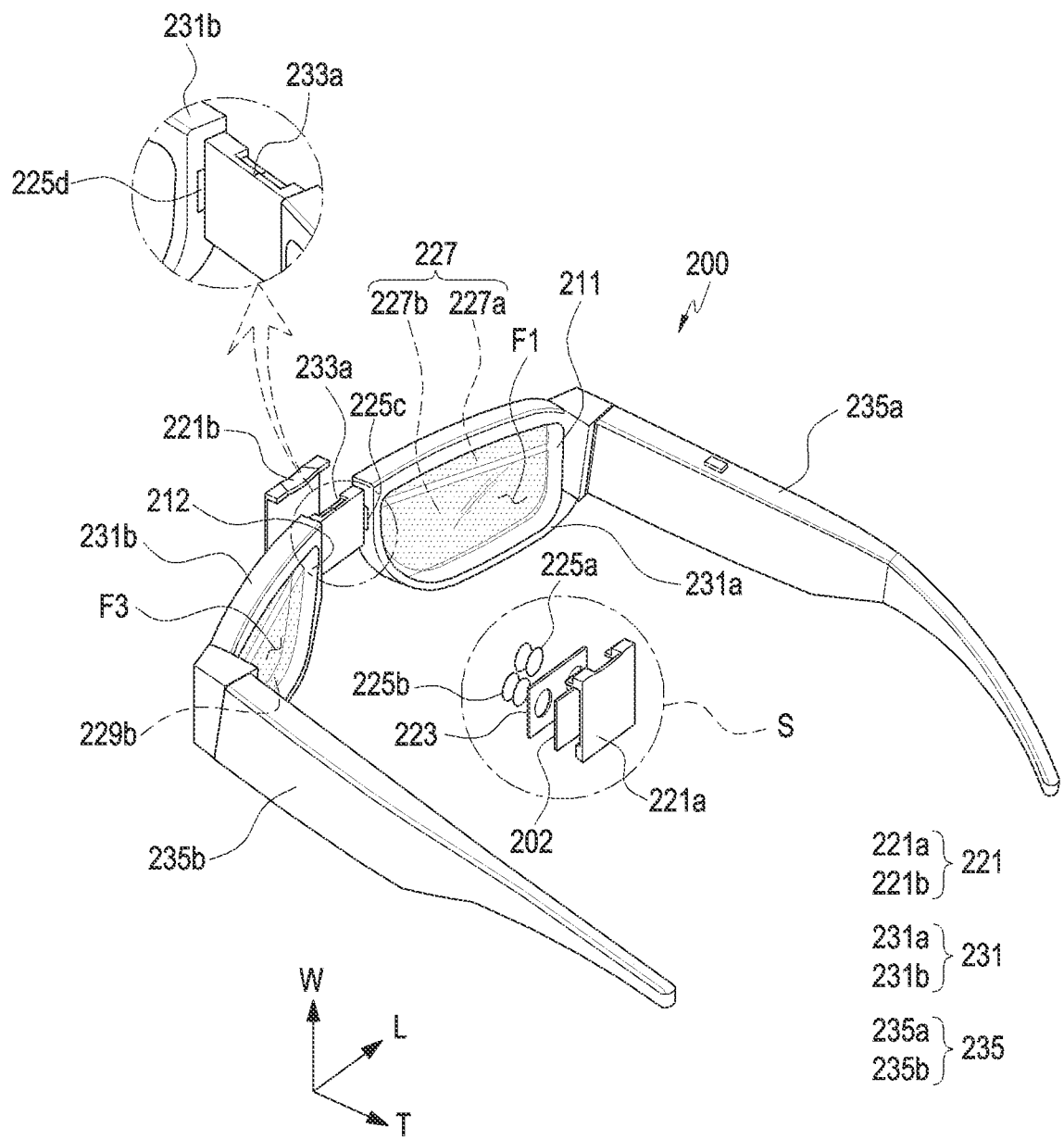
FIG. 3 is a perspective view illustrating the wearable electronic device in a partially disassembled state according to an embodiment of the disclosure.

FIG. 3 is a perspective view illustrating the wearable electronic device 200 in a partially disassembled state according to an embodiment of the disclosure.

Although not disclosed with reference to the figures, the wearable electronic device 200 may include a camera module (e.g., the camera module 180 in FIG. 1). The "first image" or "second image" to be referred to in the following detailed description may include at least some of images captured by the camera module or may be based at least in part on an image captured by the camera module. The camera module may acquire information of light in a visible light region and/or an infrared region, and the electronic device 200 (e.g., the processor 120 in FIG. 1) may use the information of light acquired through the camera module in order for spatial recognition or subject recognition. The "first image" or "second image" may include an image or text related to information on a recognized space or subject. The electronic device 200 may include a sensor configured to track the movement of the user's gaze or body (e.g., a hand), and information on light acquired through the camera module or the sensor and information on the movement the tracked gaze or body may be combined and provided as a "first image" or a "second image". The information obtained through the camera module or the sensor is transmitted to an external electronic device (e.g., the electronic device 102 or 104 and/or the server 108 in FIG. 1), and the electronic device 200 may receive a feedback from the external electronic device and output the information as a "first image" or a "second image" by using the display 202.

Referring to FIGS. 2 and 3, the wearable electronic device 200 (hereinafter, "electronic device") includes a display 202 (e.g., the display device 160 in FIG. 1), a first transparent member 211, and/or a second transparent member 212. The user may wear the electronic device 200 on the user's face. The first transparent member 211 and/or the second transparent member 212 may be formed of a glass plate or polymer, and may be fabricated to be transparent or translucent. The first transparent member 211 may be disposed to face the user's right eye, and the second transparent member 212 may be disposed to face the user's left eye. For example, the first transparent member 211 may be disposed such that a first surface F1 faces the user's right eye, and transmit at least some of light, which enters through a second surface F2, to be input to the user's right eye. The second transparent member 212 may be disposed such that a third surface F3 faces the user's left eye, and transmit at least some of light, which enters through a fourth surface F4, to be input to the user's left eye. The first transparent member 211 and/or the second transparent member 212 may be transparent or translucent, receive light, which enters through the second surface F2 and/or the fourth surface F4, and provide an image, which is output from the display 202, and the light, which enters through the second surface F2 and/or the fourth surface F4, to the user. Even when no image is output from the display 202, the light, which enters through the second surface F2 and/or the fourth surface F4, may be provided to the user.

A processor (e.g., the processor 120 in FIG. 1) of the electronic device 200 may output the first image by using a first region R1 (see FIG. 4) of the display 202 and output the second image by using a second region R2 (see FIG. 4) of the display 202 that is different from the first region R1. The processor 120 may output an image by activating one of the first region R1 and the second region R2. The processor 120 may output an image by simultaneously activating the first region R1 and the second region R2. The processor 120 may output an image by activating the first region R1 and/or the second region R2 based on the type of an image to be provided to the user or a generated event. For example, in an image for providing a user with a sense of perspective, the first region R1 and the second region R2 may be simultaneously activated to output images. As another example, when providing an alarm (e.g., a system alarm) to the user, either one of the first region R1 or the second region R2 may be activated to output an image.

For brevity of description, it is described that "the processor may output an image by using the first region R1 and/or the second region R2 of the display 202", but the disclosure is not limited thereto. For example, a driving chip (e.g., a display drive integrated chip) configured to drive the display 202 may be provided separately, and the driving chip may receive image information including an image data signal or an image control signal from the processor (e.g., the processor 120 in FIG. 1) and drive the display 202, thereby outputting visual information including a letter, an image, or an icon.

The first image may be input to the user's right eye through, for example, the first transparent member 211 (e.g., a first optical waveguide 227 to be described later), and the second image may be input to the user's left eye through the second transparent member 212 (e.g., a second optical waveguide 229 to be described later). The first transparent member 211 and/or the second transparent member 212 may be made of glass or polymer forming a grating structure, and a waveguide structure using such a grating structure (e.g., the first optical waveguide 227 and/or the second optical waveguide 229). The grating structure may include protrusions or inclined surfaces of various shapes.

The user may be provided with an augmented reality image in which a real image of a surrounding environment (e.g., surrounding objects or buildings) and an image output through the display 202 (hereinafter, "virtual image") (e.g., the first image and/or the second image). As a result, the electronic device 200 may provide a left-eye image and/or a right-eye image for implementing augmented reality to the user while including one display 202. In this arrangement, the configuration in which the first image enters the first transparent member 211 and the second image enters the second transparent member 212 is exemplified, but this division is merely for convenience of description. The first image may enter the second transparent member 212, and the second image may enter the first transparent member 211. This may be implemented in various ways depending on a combination of optical elements such as projection lenses 225a and 225b or a right pupil-left pupil separation optical system 425 (see FIG. 8), which will be described later.

When an object such as clothing, furniture, or home appliance is displayed as a virtual image, the electronic device 200 (e.g., the processor 120 in FIG. 1) may provide a virtual image by activating both the first region R1 and the second region R2 of the display 202. When text information such as time, distance, temperature, or humidity is displayed as a virtual image, the electronic device 200 may activate one of the first region R1 and the second region R2 of the display 202 to provide the virtual image. For example, depending on the type of the virtual image to be provided to the user, the electronic device 200 may activate a selected one of two different regions (e.g., the first region R1 and/or the second region R2) of the display 202.

The first image displayed on the first region R1 and the second image displayed on the second region R2 may be the same or at least partially different. For example, the first image and the second image may indicate the same content in order to make the user to feel a sense of distance in providing augmented reality. As another example, the first image and the second image may be at least partially different from each other depending on the fields of vision (FOVs) of both eyes. As another example, the first image and the second image may be at least partially different from each other in content, color, or size of the content.

The display 202 may include, for example, a liquid crystal display (LCD), a digital mirror device (DMD), a liquid crystal on silicon (LCoS) device), an organic light-emitting diode (OLED), or a micro light-emitting diode (LED). Although not illustrated, when the display 202 is constituted with one of a liquid crystal display device, a digital mirror display device, or a silicon liquid crystal display device, the electronic device 200 may include a light source configured to emit light to a screen output region (e.g., the first region R1 and the second region R2) of the display 202. When the display 202 is capable of generating light by itself, such as when the display 202 is constituted with one of organic light-emitting diodes or micro LEDs, the electronic device 200 may provide a user with a virtual image with good quality even if the electronic device 200 does not include a separate light source. When the display 202 is implemented with organic light-emitting diodes or micro LEDs, a light source is unnecessary. In this case, the electronic device may be reduced in weight.

Since the electronic device 200 is able to provide an augmented reality image through one display 202, the structure may be simplified so that weight reduction may be facilitated. Since it is possible to implement augmented reality through one display 202, a control circuit such as a driving chip (e.g., a display drive integrated chip) may be simplified, and power consumption may be reduced. For example, when a battery having the same capacity as an electronic device including a plurality of displays is provided, the electronic device 200 may operate for a longer period of time when operating in a fully charged state and may operate for an equal period of time even with a battery having a smaller capacity. When the battery is made of the same material and has the same structure, the weight of the battery is proportional to the charge capacity thereof. Thus, the weight reduction of the electronic device 200 may be further facilitated by reducing the weight of the battery.

In order to make the electronic device 200 wearable on the user's body while being equipped with the display 202, the first transparent member 211, and/or the second transparent member 212, the electronic device 200 may include a mechanical structure. For example, the electronic device 200 may include frames 231 (e.g., 231a and 231b) to which the first transparent member 211 and the second transparent member 212 are mounted, a bridge 233 interconnecting the frames 231a and 231b, and casings 221 (e.g., 221a and 221b) configured to mount or couple the display 202 to the bridge 233, or wearing members 235 (e.g., 235a and 235b). In this embodiment, the configuration of the electronic device 200 using the appearance of general glasses is exemplified, but may be implemented in other various forms for providing an augmented reality image. For example, the electronic device 200 may be implemented in the form of goggles, and at least some of the components of FIGS. 2 and 3 may be omitted or may further include other components.

The frames 231 may include a first frame 231a to which the first transparent member 211 is mounted, and a second frame 231b to which the second transparent member 212 is mounted. The first frame 231a or the second frame 231b may be configured to at least partially surround the first transparent member 211 or the second transparent member 212, and may provide at least a portion of the external appearance of the electronic device 200. Although not illustrated, the display 202 may be electrically connected to another electronic component (e.g., the circuit board 241 or the battery 243) via a conductive line (e.g., a conductive cable, a printed circuit board, or a flexible printed circuit board) disposed inside the frames 231. For example, a conductive line (not illustrated) may be provided inside the frames 231 around the first transparent member 211 or the second transparent member 212 to provide a control signal or power to the display 202.

The bridge 233 may include a bridge structure 233a interconnecting the first frame 231a and the second frame 231b, and the bridge structure 233a may be configured substantially integrally with the first frame 231a and/or the second frame 231b. The bridge 233 may provide means for supporting the electronic device 200 on the user's face. For example, the bridge 233 may be placed or supported on the user's nose. According to an embodiment of the disclosure, the first frame 231a and the second frame 231b may be partially placed or supported on the user's nose, and in this case, the bridge 233 may not come into direct contact with the user's body. Although not illustrated, the frame 231 or the bridge 233 may include an elastic member provided on a portion configured to come into contact with the user's body, thereby reducing a feeling of pressure felt by the user.

The wearing members 235 may include a first wearing member 235a extending from the first frame 231a and a second wearing member 235b extending from the second frame 231b. According to an embodiment of the disclosure, the wearing members 235 (e.g., 235a and 235b) may be rotatably coupled to the frames 231 (e.g., 231a and 231b). For example, the user may conveniently carry the electronic device 200 by rotating the wearing members 235 to overlap the frames 231 when the electronic device 200 is not worn on the face.

The electronic device 200 may include various electronic components accommodated inside the wearing members 235, such as a circuit board 241, a battery 243 (e.g., the battery 189 in FIG. 1), a speaker 245, or an antenna module 247 (e.g., the antenna module 197 in FIG. 1). Although not directly mentioned, at least one of the components illustrated in FIG. 1, for example, circuit devices such as the processor 120, the memory 130, and the communication module 190 of FIG. 1 may be mounted on a circuit board the 241 and disposed inside the wearing members 235. According to an embodiment of the disclosure, the camera module 180 of FIG. 1 may be mounted on the frames 231 or the wearing members 235 to photograph a subject or acquire surrounding environment information (e.g., image information) for implementing augmented reality.

In consideration of the center of gravity of the electronic device 200, the electronic components may be appropriately distributed in the first wearing member 235a and the second wearing member 235b. For example, when the battery 243 is disposed in the first wearing member 235a, the circuit board 241 and the antenna module 247 may be disposed in the second wearing member 235b. In some embodiments, some of the electronic components (e.g., the speakers 245) may be disposed in the first wearing member 235a and the second wearing member 235b, respectively. A processor of the electronic device 200 (e.g., the processor 120 of FIG. 1) may be disposed on the circuit board 241, and the display 202 may be electrically connected to the circuit board 241 or the battery 243 via a conductive line (not illustrated). At least one of the electronic components (e.g., the camera module 180 or the sensor module 176 of FIG. 1) may be disposed in the bridge 233 or the frames 231 (e.g., 231a, 231b).

The electronic device 200 may include a casing 221 coupled to the bridge structure 233a. The casing 221 may be interpreted as a portion of the bridge 233 and include a first casing 221a and a second casing 221b. The first casing 221a may be coupled to the inner surface (e.g., the surface facing the user's face in the worn state) of the bridge structure 233a, and the second casing 221b may be coupled to the outer surface of the bridge structure 233a. According to an embodiment of the disclosure, Both of the first casing 221a and the second casing 221b may be bound to the bridge structure 233a. According to another embodiment of the disclosure, the first casing 221a and the second casing 221b may be bound to face each other with a portion of the bridge structure 233a interposed therebetween. When viewed from the external appearance of the electronic device 200, the casing 221 may be viewed as a portion of the bridge 233, as described above. According to an embodiment, when viewed from the external appearance of the electronic device 200, the first frame 231a and the second frame 231b may be viewed as being connected to each other via the casing 221. For example, at least one of the first casing 221a or the second casing 221b may be connected to the first frame 231a and/or the second frame 231b.

The display 202 may be mounted on the bridge structure 233a via the casing 221. For example, the casing 221 (e.g., the first casing 221a) may be mounted on the bridge structure 233a in a state of surrounding at least a portion of the display 202. An image output from the display 202 may be provided to the first transparent member 211 or the second transparent member 212 to be input to the user's naked eye. The arrangement structure of the display 202 or the structure of guiding an image output from the display 202 to the first transparent member 211 or the second transparent member 212 will be described with further reference to FIG. 4 which is an enlarged view of the portion indicated by "S" in FIG. 3.

Figure 4:
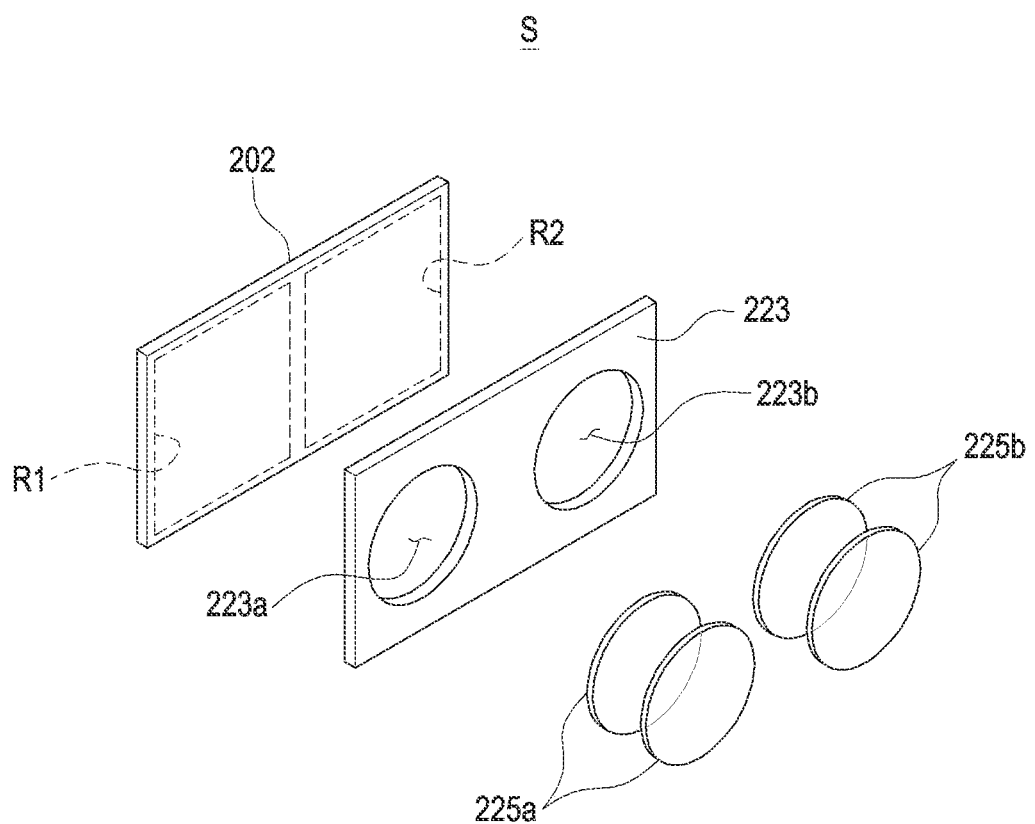
FIG. 4 is an exploded perspective view for describing the arrangement of a display or projection lenses of the wearable electronic device according to an embodiment of the disclosure.

FIG. 4 is an exploded perspective view for describing the arrangement of the display 202 or the projection lenses 225a and 225b of the wearable electronic device 200 according to an embodiment of the disclosure.

Further referring to FIG. 4, the electronic device 200 may include at least one first projection lens 225a and at least one second projection lens 225b. The first projection lens 225a and/or second projection lens 225b may be differently configured in terms of the number of lenses and/or the distance between lenses based on at least one of a material, a size, a refractive index, a power, or a thickness and/or the position or size of an input port (e.g., a first input port 225c or a second input port 225d). For example, the number of first projection lenses 225a and/or the number of second projection lenses 225b may be one or two or more. The first projection lens 225a may be disposed to correspond to the first region R1 of the display 202. For example, the first projection lens 225a may guide or input a first image, which is output from the first region R1, to the first transparent member 211. It is noted that, although FIG. 4 illustrates a pair of first projection lenses 225a, the disclosure is not limited thereto. For example, the number of first projection lenses 225a may be one or three or more. The second projection lens 225b may be disposed to correspond to the second region R2 of the display 202. For example, the second projection lens 225b may guide or input a second image, which is output from the second region R2 of the display, to the second transparent member 212. It is noted that, although FIG. 4 illustrates a pair of second projection lenses 225b, the disclosure is not limited thereto. For example, the number of second projection lenses 225b may be one or three or more. According to an embodiment of the disclosure, the first projection lenses 225a and the second projection lenses 225b may be the same as or at least partially different from each other. For example, the first projection lens 225a and the second projection lens 225b may be different from each other in some of material, size, refractive index, power, or thickness.

The electronic device 200 may further include a mask 223 mounted or disposed in the casing 221. The mask 223 may be disposed between the display 202 and the first projection lens 225a and/or between the display 202 and the second projection lens 225b. For example, a portion of the mask 223 may be disposed between the display 202 and the first projection lens 225a, and another portion of the mask 223 may be disposed between the display 202 and the second projection lens 225b. The mask 223 may include a first opening region 223a corresponding to the first region R1 of the display 202 and a second opening region 223b corresponding to the second region R2 of the display 202. For example, the first opening region 223a and the second opening region 223b may be disposed side by side and provided through the mask 223. It is noted that, although FIG. 4 illustrates the first opening region 223a and/or the second opening region 223b in a circular shape, the disclosure is not limited thereto. For example, the first opening region 223a and/or the second opening region 223b may have a shape corresponding to a region (e.g., the first region R1 and/or the second region R2) to which an actual image is output from the display 202, and a region to which an actual image is output from the display 202 may be configured to correspond to the shape or size of the first opening region 223a and/or the second opening region 223b. The mask 223 is a light shielding member that substantially blocks light, and an image output from the display 202 may pass through the mask 223 through the first opening region 223a or the second opening region 223b. For example, the first image and the second image may reach the first projection lens 225a or the second projection lens 225b through paths defined by the mask 223 or independent of each other.

The size of the first opening region 223a and/or the second opening region 223b of the mask 223 may be substantially the same as the size of the first projection lens 225a and/or the second projection lens 225b. For example, the size and shape of the first opening region 223a may be the same as those of the first projection lens 225a. As another example, the size and shape of the first opening region 223a may be different from those of the first projection lens 225a. At a position where the first projection lens 225a and/or the second projection lens 225b are disposed, the size of the region to which light passing through the first opening region 223a and/or the second opening region 223b is emitted may be the same as or smaller than that of the first projection lens 225a and/or the second projection lens 225b. For example, the light passing through the first opening region 223a and/or the second opening region 223b may be substantially input to the first projection lens 225a and/or the second projection lens 225b.

The first projection lens 225a may be disposed to correspond to the first opening region 223a to guide the first image to be displayed on the first region R1 of the display 202 to the first transparent member 211, and the second projection lens 225b may be disposed to correspond to the second opening region 223b to guide the second image to be displayed on the second region R2 of the display 202 to the second transparent member 212. Although not illustrated, other optical elements may be arranged between the first projection lens 225a and the first transparent member 211 and/or between the second projection lens 225b and the second transparent member 212. The other optical elements may include a reflective mirror, a prism, or a half mirror. For example, the other optical elements may be arranged between the first projection lens 225a and the first transparent member 211 and/or between the second projection lens 225b and the second transparent member 212 to set a traveling path of light or image from the first projection lens 225a to the first transparent member 211 and/or a traveling path of light or image from the second projection lens 225b to the second transparent member 212. The first image or the second image passing through the first projection lens 225a or the second projection lens 225b may be provided to a region smaller than the first region R1 or the second region R2 of the display 202 (e.g., the first input port 225c and/or the second input port 225d). For example, the first projection lens 225a may be interpreted as a first condensing lens, and the second projection lens 225b may be interpreted as a second condensing lens.

The first image passing through the first projection lens 225a may be provided to the first transparent member 211 through the first input port 225c (see FIG. 3) formed in the bridge 233 or a frame 231 (e.g., 231a). For example, the first projection lens 225a condenses the first image to the first input port 225c, and the first image may be provided to the first transparent member 211 through the first input port 225c. The second image passing through the second projection lens 225b may be provided to the second transparent member 212 through the second input port 225d (see FIG. 3) formed in the bridge 233 or a frame 231 (e.g., 231b). For example, the second projection lens 225a condenses the second image to the second input port 225d, and the second image may be provided to the second transparent member 212 through the second input port 225d. The first transparent member 211 or the second transparent member 212 may include optical waveguides 227 and 229 (see FIG. 3 or 5) provided therein or on the surface thereof, and may input the first image (or the second image) to the user's naked eyes by using the optical waveguides 227 and 229. The optical waveguides 227 and 229 may provide the first image and/or the second image to the user's naked eyes by using a diffraction, polarization, refraction, or reflection structure, or a holographic effect.

Of the optical waveguides 227 and 229, the first optical waveguide 227 may be formed in the first transparent member 211 and receive the first image through the first projection lens 225a. Of the optical waveguides 227 and 229, the second optical waveguide 229 may be formed in the second transparent member 212 and receive the second image through the second projection lens 225b. According to an embodiment of the disclosure, the first optical waveguide 227 and the second optical waveguide 229 may have substantially the same structure, and may be disposed symmetrically to each other on the electronic device 200. The configurations of the optical waveguides 227 and 229 will be described in more detail with reference to the second transparent member 212 of FIG. 5.

Figure 5:
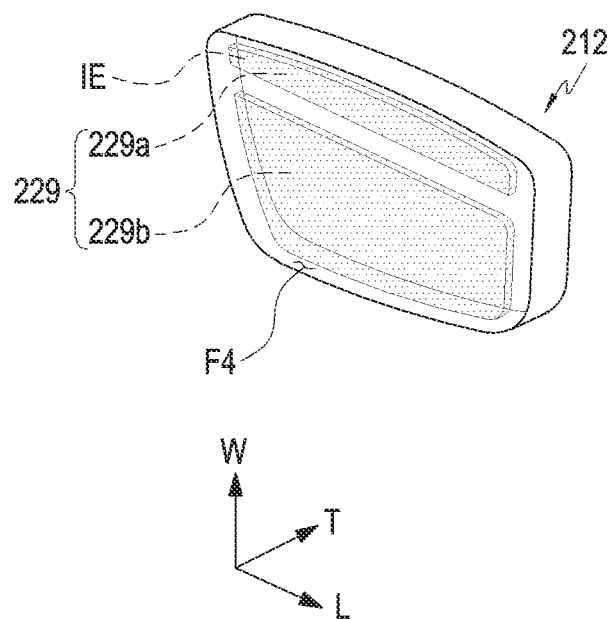
FIG. 5 is a perspective view illustrating a transparent member of the wearable electronic device according to an embodiment of the disclosure.

FIG. 5 is a perspective view illustrating a transparent member (e.g., a second transparent member 212) of the wearable electronic device 200 according to an embodiment of the disclosure.

Referring to FIG. 5, the second optical waveguide 229 may include a first waveguide portion 229a and a second waveguide portion 229b. The first waveguide portion 229a and the second waveguide portion 229b may include a nanopattern, such as a polygonal or curved grating structure formed in the inside or on the surface of the second transparent member 212 made of glass or polymer. Light entering one end IE of the first waveguide part 229a may be propagated inside the first waveguide part 229a or the second waveguide part 229b by the nano-pattern. The first waveguide part 229a may receive the second image through the one end IE aligned with the second input port 225d and may transmit the second image in the length direction L or the width direction W of the second transparent member 212. The second image is transmitted to the second waveguide portion 229b through the first waveguide portion 229a, and a virtual image that can be actually recognized by the user may be formed in the second waveguide portion 229b. For example, the second optical waveguide 229 may serve as a portion of a path that receives the second image (or the first image) output from the display 202 and guides the second image to the user's naked eyes.

Although the shapes of the first waveguide portion 229a and the second waveguide portion 229b are illustrated in FIG. 5, it is noted that the disclosure is not limited thereto. According to an embodiment of the disclosure, the first waveguide portion 229a may have a shape extending in any one or two or more of the length direction (L), the thickness direction (T), and the width direction (W) of the second transparent member 212, and the second waveguide portion 229b may have a shape different from the shape illustrated in FIG. 5 depending on the shape of the first waveguide portion 229a. For example, in FIG. 5, the second waveguide portion 229b and the first waveguide portion 229a are illustrated as being separated from each other, but in some embodiments, the second waveguide portion 229b may be connected to the first waveguide portion 229a. The shapes of the first waveguide portion 229a and the second waveguide portion 229b may be variously designed depending on the actually fabricated electronic device 200, the shape, size and/or position of the display 202, the position at which an image (e.g., the first image or the second image) generated by the display 202 is displayed, or the shape or size of the second transparent member 212.

In FIG. 5, the second optical waveguide 229 is illustrated as having a darker color than other portions of the second transparent member 212, but it is noted that this is for convenience of description. For example, the second optical waveguide 229 may transmit light input to the user's naked eyes from the outside, and may have the same color or density as other portions of the second transparent member 212. For example, the second optical waveguide 229 may not be substantially identified by the user's naked eyes.

Although not illustrated in FIG. 5, the first transparent member 211 may include the same components as the second transparent member, and the structures and roles of respective components may be the same. For example, the first transparent member 211 may include a first optical waveguide 227 corresponding to the second optical waveguide 229, and the first optical waveguide 227 may include the first waveguide portion 227a and the second optical waveguide portion 227b.

Referring back to FIGS. 2 to 4, in the display 202, the first region R1 may be disposed adjacent to the first transparent member 211, and the second region R2 may be disposed adjacent to the second transparent member 212. For example, on the electronic device 200, the display 202 may be mounted on the bridge structure 233a in the state of horizontally elongated alignment (e.g., in the length direction L). In another embodiment, the display 202 may be mounted on the bridge structure 233a in the state of vertically elongated alignment (e.g., in the width direction W).

Figure 6:
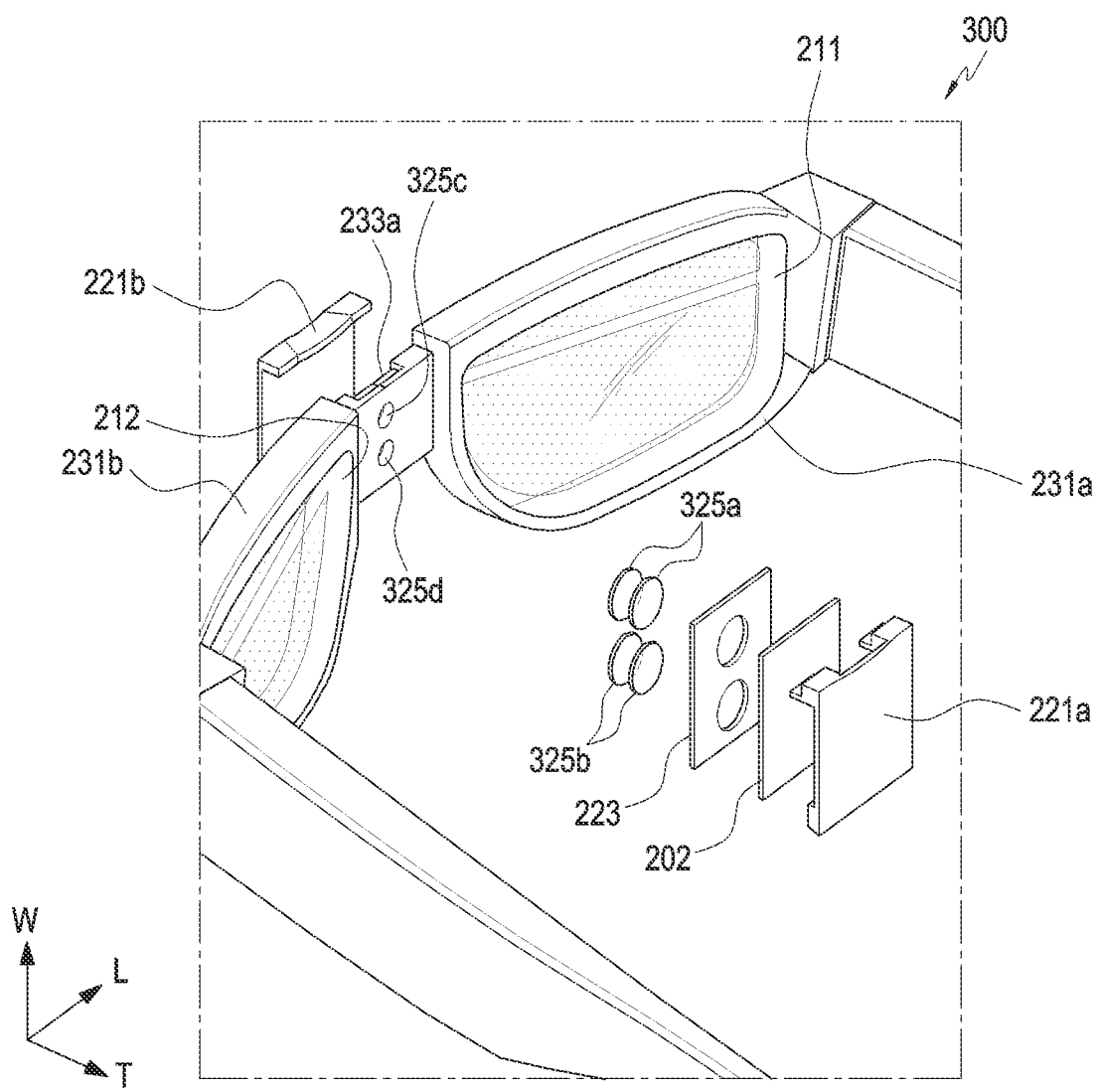
FIG. 6 is an enlarged exploded perspective view illustrating a portion of a wearable electronic device according to an embodiment of the disclosure.

FIG. 6 is an enlarged exploded perspective view illustrating a portion of a wearable electronic device 300 (e.g., the wearable electronic device 200 in FIG. 2 or 3) according to an embodiment of the disclosure.

Referring to FIG. 6, in a structure in which the display 202 is vertically aligned (e.g., in the width direction W), the first region (e.g., the first region R1 of FIG. 4) may be defined as an upper region of the display 202, and a second region (e.g., the first region R2 of FIG. 4) may be defined as a lower region of the display 202. For example, the first transparent member 211 and the second transparent member 212 are arranged along the length direction L, and the first region R1 and the second region R2 may be arranged in the width direction W perpendicular to the length direction L. In this case, the input ports 325c and 325d are arranged in the width direction W on the bridge structure 233a, the first projection lens 325a is disposed between the upper region of the display 202 and the first input port 325c, and the second projection lens 325b may be disposed between the lower region of the display 202 and the second input port 325d, thereby forming a light traveling path. According to an embodiment of the disclosure, the display 202 maybe aligned to be elongated vertically as in FIG. 6, and the input ports may be disposed at the positions illustrated in FIG. 3. In this case, not only projection lenses, but also additional optical elements such as a prism or a reflector may be disposed between the display 202 and the input ports to form a light traveling path. For example, the direction in which the display 202 is mounted or aligned in an actually manufactured electronic device 300 or the traveling path of an image output from the display 202 may be variously implemented in consideration of the use environment or external appearance of the electronic device 300. In order to form an image traveling path, some projection lenses of the above-described embodiments may be omitted, and in addition to the disclosed projection lenses, various optical elements may be added as necessary.

In a structure in which the display 202 is aligned to be elongated vertically (e.g., in the width direction W), the first transparent member 211 and the second transparent member 212 may be at least partially different from each other. For example, the first optical waveguide (e.g., the first optical waveguide 227 in FIG. 2) and the second optical waveguide (e.g., the second optical waveguide 229 in FIG. 2) may be different from each other in shape and position.

Figure 7:
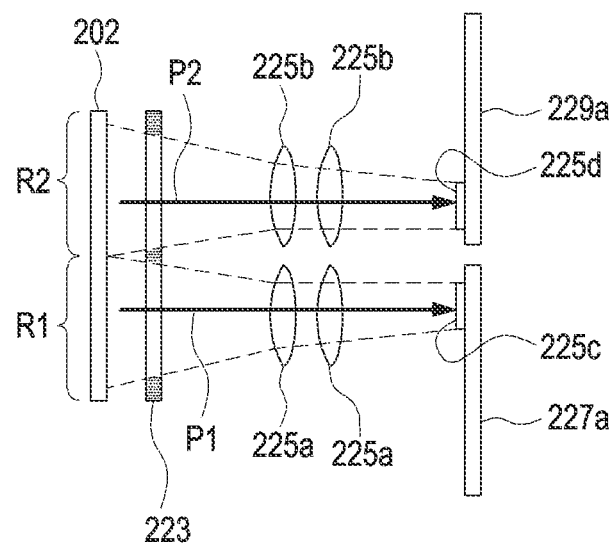
FIG. 7 is a view for describing paths through which a virtual image travels in a wearable electronic device according to an embodiment of the disclosure.

FIG. 7 is a view for describing paths through which a virtual image travels in a wearable electronic device (e.g., the electronic device 200 in FIG. 2 or 3) according to an embodiment of the disclosure.

Referring to FIG. 7, a processor (e.g., the processor 120 in FIG. 1) of the electronic device 200 may output a first image (e.g., a right eye image) by using the first region R1 of the display 202. The path indicated by "P1" in FIG. 8 may mean a path through which the first image travels. The first image may be transmitted to a first input port (e.g., the first input port 225c in FIG. 3) through the first projection lens(es) 225a. The first image may be provided to the first optical waveguide 227 (e.g., the first waveguide portion 227a) through the first input port (e.g., the first input port 225c in FIG. 3). For example, the first image may be provided to the first transparent member 211 by being guided by the first projection lens(es) 225a, and may be input to the user's right eye through the first optical waveguide 227, (e.g., the first waveguide portion 227a and the second waveguide portion 227b).

A processor (e.g., the processor 120 in FIG. 1) of the electronic device 200 may output a second image (e.g., a left eye image) by using the second region R2 of the display 202. The path indicated by "P2" in FIG. 8 may mean a path through which the second image travels. The second image may be provided to the second optical waveguide 229 (e.g., the first waveguide portion 229a) through the second projection lens(3s) 225b and/or an input port (e.g., the second input port 225d in FIG. 3). For example, the second image may be provided to the second transparent member 212 by being guided by the second projection lens(es) 225b, and may be input to the user's left eye through the second optical waveguide 229 (e.g., the first waveguide portion 229a and the second waveguide portion 229b.)

Figure 8:
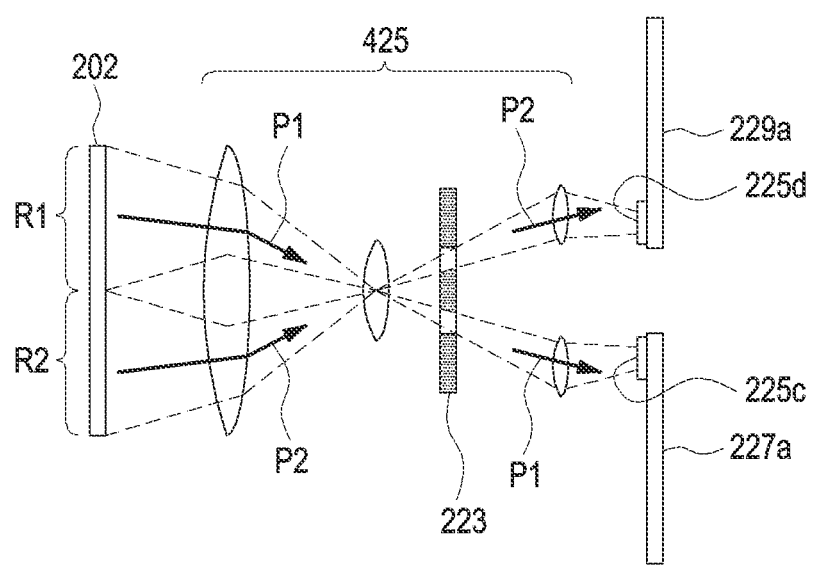
FIG. 8 is a view for describing paths through which a virtual image travels in a wearable electronic device according to an embodiment of the disclosure.

FIG. 8 is a view for describing paths through which a virtual image travels in a wearable electronic device (e.g., the electronic device 200 in FIG. 2 or 3) according to an embodiment of the disclosure.

Referring to FIG. 8, the electronic device 200 may further include a right pupil-left pupil separation optical system 425. Although not illustrated, the right pupil-left pupil separation optical system 425 may be combined with the first projection lenses 225a and/or the second projection lenses 225b of the preceding embodiments. In another embodiment, the right pupil-left pupil separation optical system 425 may include or be combined with the first projection lenses 225a and/or the second projection lenses 225b of the preceding embodiments.

The right pupil-left pupil separation optical system 425 may include a mask 223. For example, the right pupil-left pupil separation optical system 425 may include a plurality of projection lenses (e.g., the first projection lenses 225a and/or the second projection lenses 225b) and a mask 223, and images (e.g., the first image and/or the second image) output from the display 202 may be transmitted to the input ports (e.g., the first input port 225c and/or the second input port 225d) through the plurality of projection lenses (e.g., the first projection lenses 225a and/or the second projection lenses 225b) of the right pupil-left pupil separation optical system 425 and the mask 223. The positions of the plurality of projection lenses (e.g., the first projection lenses 225a or the second projection lenses 225*b*) of the right pupil-left pupil separation optical system 425 and/or the position of the mask 223 or the sizes of opening regions (e.g., the first opening region 223*a* or the second opening region 223*b*) may vary.

A processor (e.g., the processor 120 in FIG. 1) of the electronic device 200 may output the first image (e.g., the right eye image) by using the first region R1 of the display 202. The path indicated by "P1" in FIG. 8 may mean a path through which the first image travels. The first image may pass through the right pupil-left pupil separation optical system 425 to be provided to the first input port (e.g., the first input port 225*c* in FIG. 3) and the first optical waveguide 227 (e.g., the first waveguide portion 227*a*). For example, the first image may be provided to the first transparent member (e.g., the first transparent member 211 in FIG. 2 or 3) by being guided by the right pupil-left pupil separation optical system 425, and may be input to the user's right eye through the first optical waveguide 227, for example, the first waveguide portion 227*a* and the second waveguide portion 227*b*.

The processor (e.g., the processor 120 in FIG. 1) of the electronic device may output the second image (e.g., the left eye image) by using the second region R2 of the display 202. The path indicated by "P2" in FIG. 8 may mean a path through which the second image travels. The second image may pass through the right pupil-left pupil separation optical system 425 to be provided to an input port (e.g., the second input port 225*d* in FIG. 3) and the second optical waveguide 229 (e.g., the second waveguide portion 229*a*). The second image may be provided to one end IE of the first waveguide portion 229*a* through the right pupil-left pupil separation optical system 425. For example, the second image may be provided to the second transparent member (e.g., the second transparent member 212 in FIG. 2 or 3) by being guided by the right pupil-left pupil separation optical system 425, and may be input to the user's left eye through the second optical waveguide 229, for example, the first waveguide portion 229*a* and the second waveguide portion 229*b*.

The path P1 and the path P2 may be provided to cross each other between the right pupil-left pupil separation optical system 425 and the first waveguide portions 227*a* and 229*a*. For example, the first region R1 of the display 202 is disposed adjacent to the second transparent member 212, and the second region R2 of the display 202 is disposed adjacent to the first transparent member 211. However, the first image may be provided to the first transparent member 211 along the path P1, which crosses the path P2 along which the second image travels, by being guided by the right pupil-left pupil separation optical system 425, and the second image may be provided to the second transparent member 212 along the path P2, which crosses the path P1 along which the first image travels, by being guided by the right pupil-left pupil separation optical system 425.

According to an embodiment of the disclosure, although not illustrated in FIG. 8, a second mask may be located between the display 202 and the right pupil-left pupil separation optical system 425. The second mask is a light shielding member that substantially blocks light, and an image output from the display 202 may pass through the second mask to reach the right pupil-left pupil separation optical system 425.

As described above, according to embodiment of the disclosure, a wearable electronic device (e.g., the electronic device 101 or 200 in FIG. 3) disclosed herein may include a display (e.g., the display device 160 in FIG. 1 or the display 202 in FIGS. 3 and 4), a first transparent member (e.g., the first transparent member 211 in FIG. 2 or 3) including a first surface (e.g., the first surface F1 in FIG. 3) disposed to face a user's right eye, and a second surface (e.g., the second surface F2 in FIG. 1) facing away from the first surface, wherein the first transparent member is configured to input light, which enters through the second surface, to the user's right eye, a second transparent member (e.g., the second transparent member 212 in FIG. 2 or 3) including a third surface (e.g., the third surface F3 in FIG. 3) disposed to face the user's left eye, and a fourth surface (e.g., the fourth surface F4 in FIG. 2) facing away from the third surface, wherein the second transparent member is configured to input light, which enters through the fourth surface, to the user's left eye, and a processor (e.g., the processor 120 in FIG. 1) configured to output a first image by using a first region of the display or output a second image by using a second region different from the first region, wherein the first transparent member may be configured to receive the first image and input the first image to the user's right eye, and the second transparent member may be configured to receive the second image and input the second image to the user's left eye.

The wearable electronic device may further include at least one first projection lens (e.g., the first projection lens 225*a* in FIG. 3 or 4) configured to guide or input the first image to the first transparent member, and at least one second projection lens (e.g., the second projection lens 225*b* in FIG. 3 or 4) configured to guide or input the second image to the second transparent member to the second transparent member.

The first transparent member or the second transparent member may include an optical waveguide (e.g., the optical waveguide 227 or 229 of FIGS. 2 and 3 or FIG. 5) and be configured to input the first image or the second image to the user's right eye or left eye by using the optical waveguide.

The wearable electronic device may further include at least one first projection lens configured to guide or input the first image to the first transparent member, at least one second projection lens configured to guide or input the second image to the second transparent member, a first optical waveguide (e.g., the first optical waveguide 227 in FIG. 3) formed in the first transparent member and configured to receive the first image through the first projection lens, and a second optical waveguide (e.g., the second optical waveguide 229 in FIG. 5) formed in the second transparent member and configured to receive the second image through the second projection lens.

The display may include an organic light emitting diode (OLED) or a micro LED.

The wearable electronic device may further include a casing (e.g., the casing 221; 221*a*, 221*b* in FIG. 2 or 3) coupled to surround at least a portion of the display, and a mask (e.g., the mask 223 in FIG. 3 or 4) mounted in the casing and including a first opening region (e.g., the first opening region 223*a* in FIG. 4) corresponding to the first region and a second opening region (e.g., the second opening region 223*b* in FIG. 4) corresponding to the second region.

The wearable electronic device may further include at least one first projection lens disposed to correspond to the first opening region and configured to guide or input the first image to the first transparent member, and at least one second projection lens disposed to correspond to the second opening region and configured to guide or input the second image to the second transparent member.

The wearable electronic device may further include a first optical waveguide formed in the first transparent member and configured to receive the first image through the first projection lens, and a second optical waveguide formed in the second transparent member and configured to receive the second image through the second projection lens.

The wearable electronic device may include a first frame (e.g., the first frame 231a in FIG. 2 or 3) to which the first transparent member is mounted, a second frame (e.g., the second frame 231b in FIG. 2 or 3) to which the second transparent member is mounted, and a bridge structure (e.g., the bridge structure 233a of FIG. 3) interconnecting the first frame and the second frame, wherein the display may be disposed on the bridge structure.

The wearable electronic device may further include a first wearing member (e.g., the first wearing member 235a in FIG. 2 or 3) extending from the first frame, and a second wearing member (e.g., the second wearing member 235b of FIG. 2 or 3) extending from the second frame.

The wearable electronic device may further include, a circuit board (e.g., the circuit board 241 in FIG. 2) accommodated in the first wearing member or the second wearing member, and a battery (e.g., the battery 243 in FIG. 2) accommodated in the first wearing member or the second wearing member, wherein the processor may be provided on the circuit board.

The wearable electronic device may further include a casing coupled to surround at least a portion of the display and mounted to the bridge structure, and a mask mounted in the casing and including a first opening region corresponding to the first region and a second opening region corresponding to the second region.

The wearable electronic device may further include at least one first projection lens disposed to correspond to the first opening region and configured to guide or input the first image to the first transparent member; and at least one second projection lens disposed to correspond to the second opening region and configured to guide or input the second image to the second transparent member.

The wearable electronic device may further include a first optical waveguide formed in the first transparent member and configured to receive the first image through the first projection lens, and a second optical waveguide formed in the second transparent member and configured to receive the second image through the second projection lens.

According to an embodiment of the disclosure, a wearable electronic device may include a display, a first transparent member disposed to face a user's right eye, and configured to transmit light incident from the outside to enter the user's right eye, a second transparent member disposed to face the user's left eye and configured to transmit light incident from the outside and input the light to the user's left eye, at least one first projection lens disposed to correspond to a first region of the display and configured to guide or input an image (hereinafter, "first image") output from the first region to the first transparent member, and at least one second projection lens disposed to correspond to a second region of the display that is different from the first region, and configured to guide or input an image (hereinafter, "second image") output from the second region to the second transparent member, wherein the first transparent member may be configured to input the first image to the user's right eye, and the second transparent member may be configured to input the second image to the user's left eye.

The wearable electronic device may further include a first optical waveguide formed in the first transparent member and configured to receive the first image via the first projection lens, and a second optical waveguide formed in the second transparent member and configured to receive the second image through the second projection lens.

The first region and the second region may be arranged in a direction perpendicular to a direction in which the first transparent member and the second transparent member are arranged.

The wearable electronic device may further include a first frame to which the first transparent member is mounted, a second frame to which the second transparent member is mounted, a bridge structure interconnecting the first frame and the second frame, a first wearing member extending from the first frame, and a second wearing member extending from the second frame, wherein the display may be disposed on the bridge structure.

The wearable electronic device may further include a circuit board accommodated in the first wearing member or the second wearing member, and a processor provided on the circuit board, wherein the processor may be configured to output the first image by using the first region and output the second image by using the second region.

The wearable electronic device described above may further include a casing coupled to surround at least a portion of the display, and a mask mounted in the casing and including a first opening region corresponding to the first region and a second opening region corresponding to the second region, wherein the first opening region may be aligned between the first region and the first projection lens, and the second opening region may be aligned between the second region and the second projection lens.

While the disclosure has been shown and described with reference to various embodiments thereof, it will be understood by those skilled in the art that various changes in form and details may be made without therein departing from the spirit and scope of the disclosure as defined by the appended claims and their equivalents.

What is claimed is:
1. A wearable electronic device comprising:
a display;
a first transparent member configured to input light, which enters through a second surface, to a user's right eye, the first transparent member including:
a first surface disposed to face the user's right eye, and
the second surface facing away from the first surface;
a second transparent member configured to input light, which enters through a fourth surface, to the user's left eye, the second transparent member including:
a third surface disposed to face the user's left eye, and
the fourth surface facing away from the third surface;
a processor configured to output a first image by using a first region of the display and output a second image by using a second region of the display different from the first region;
at least one first projection lens configured to guide or input the first image to the first transparent member; and
at least one second projection lens configured to guide or input the second image to the second transparent member,
wherein, while the user observes a surrounding environment through the first transparent member, the first transparent member is further configured to:
receive the first image, and
provide a first virtual image based on the first image to the user's right eye along with a real image of the surrounding environment, and wherein, while the user observes a surrounding environment through the second transparent member, the second transparent member is further configured to:
receive the second image, and
provide a second virtual image based on the second image to the user's left eye along with the real image of the surrounding environment.

2. The wearable electronic device of claim 1, wherein the first transparent member or the second transparent member comprises an optical waveguide, and is configured to input the first virtual image or the second virtual image to the user's right eye or left eye by using the optical waveguide.

3. The wearable electronic device of claim 1, further comprising:
a first optical waveguide formed in the first transparent member and configured to receive the first image via the first projection lens; and
a second optical waveguide formed in the second transparent member and configured to receive the second image via the second projection lens.

4. The wearable electronic device of claim 1, wherein the display comprises an organic light-emitting diode (OLED) or a micro light-emitting diode (LED).

5. The wearable electronic device of claim 1, further comprising:
a casing coupled to surround at least a portion of the display; and
a mask mounted in the casing and including a first opening region corresponding to the first region and a second opening region corresponding to the second region.

6. The wearable electronic device of claim 5, wherein the at least one first projection lens is disposed to correspond to the first opening region, and
wherein the at least one second projection lens is disposed to correspond to the second opening region.

7. The wearable electronic device of claim 6, further comprising:
a first optical waveguide formed in the first transparent member and configured to receive the first image via the first projection lens; and
a second optical waveguide formed in the second transparent member and configured to receive the second image via the second projection lens.

8. The wearable electronic device of claim 1, further comprising:
a first frame to which the first transparent member is mounted;
a second frame to which the second transparent member is mounted; and
a bridge structure interconnecting the first frame and the second frame,
wherein the display is disposed on the bridge structure.

9. The wearable electronic device of claim 8, further comprising:
a first wearing member extending from the first frame; and
a second wearing member extending from the second frame.

10. The wearable electronic device of claim 9, further comprising:
a circuit board accommodated in the first wearing member or the second wearing member; and
a battery accommodated in the first wearing member or the second wearing member,
wherein the processor is provided on the circuit board.

11. The wearable electronic device of claim 8, further comprising:
a casing coupled to surround at least a portion of the display and mounted to the bridge structure; and
a mask mounted in the casing and including a first opening region corresponding to the first region and a second opening region corresponding to the second region.

12. The wearable electronic device of claim 11, wherein the at least one first projection lens is disposed to correspond to the first opening region, and
wherein the at least one second projection lens is disposed to correspond to the second opening region.

13. The wearable electronic device of claim 12, further comprising:
a first optical waveguide formed in the first transparent member and configured to receive the first image via the first projection lens; and
a second optical waveguide formed in the second transparent member and configured to receive the second image via the second projection lens.

14. The wearable electronic device of claim 12, wherein the at least one first projection lens differs from the at least one second projection lens in at least one a material, size, refractive index, power, or thickness.

15. The wearable electronic device of claim 8, wherein the bridge includes:
a first input port through which the first image is provided to the first transparent member, and
a second input port through which the second image is provided to the second transparent member.

16. The wearable electronic device of claim 1, wherein the first region and the second region are arranged in a direction perpendicular to a direction in which the first transparent member and the second transparent member are arranged.

* * * * *